United States Patent
Hachiya et al.

(10) Patent No.: US 7,439,719 B2
(45) Date of Patent: Oct. 21, 2008

(54) SWITCHING CONTROL CIRCUIT WITH OFF PERIOD ADJUSTMENT

(75) Inventors: Yoshiaki Hachiya, Shiga (JP);
Ryutarou Arakawa, Hyogo (JP);
Takashi Kunimatsu, Shiga (JP);
Minoru Fukui, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 260 days.

(21) Appl. No.: 11/525,128

(22) Filed: Sep. 22, 2006

(65) Prior Publication Data

US 2007/0176583 A1 Aug. 2, 2007

(30) Foreign Application Priority Data

Jan. 27, 2006 (JP) ............................. 2006-018308

(51) Int. Cl.
*G05F 1/56* (2006.01)

(52) U.S. Cl. ..................................... 323/282

(58) Field of Classification Search ................. 323/282, 323/283
See application file for complete search history.

(56) References Cited

U.S. PATENT DOCUMENTS

| | | | | |
|---|---|---|---|---|
| 6,476,589 B2 * | 11/2002 | Umminger et al. | .......... | 323/282 |
| 6,495,995 B2 * | 12/2002 | Groom et al. | .............. | 323/283 |
| 6,525,514 B1 * | 2/2003 | Balakrishnan et al. | ...... | 323/277 |
| 6,914,789 B2 * | 7/2005 | Kinoshita et al. | ......... | 363/21.12 |
| 2007/0103134 A1 * | 5/2007 | Yang et al. | .................. | 323/282 |

FOREIGN PATENT DOCUMENTS

| | | |
|---|---|---|
| JP | 5-276761 | 10/1993 |
| JP | 2004-208382 | 7/2004 |
| JP | 2004-336860 | 11/2004 |

* cited by examiner

*Primary Examiner*—Jeffrey L Sterrett
(74) *Attorney, Agent, or Firm*—Steptoe & Johnson LLP

(57) ABSTRACT

A switching control circuit is provided which can increase the off period of a switching element when the on period of the switching element is equal to the sum of the minimum pulse period (blanking period (a fixed period during which drain current is not detected after the switching element is turned on)) and a detection delay period (a period from when the drain current is equal to or higher than a detection criterion to when the switching element is actually turned off) and PWM control is disabled. An off period adjusting circuit generates, when the on period of the switching element is equal to the minimum pulse period, an adjusting signal OFF_C for increasing the off period of the switching element and supplies the signal to an on/off circuit for controlling the periodic on/off operation of the switching element.

3 Claims, 15 Drawing Sheets

SWITCHING CONTROL CIRCUIT WITH OFF PERIOD ADJUSTMENT

FIELD OF THE INVENTION

The present invention relates to a switching control circuit used for a switching power supply and an LED driver.

BACKGROUND OF THE INVENTION

Conventionally, switching power supplies using switching control circuits are widely used as power supplies for supplying power to kinds of electronic equipment for home use and industrial use. Further, LED drivers using switching control circuits are conventionally proposed as LED drivers. The following will describe conventional switching control circuits used for switching power supplies and LED drivers.

FIGS. 10A and 10B are block diagrams schematically showing the conventional switching control circuits. In FIGS. 10A and 10B, reference numeral 1 denotes an inductive load, reference numeral 2 denotes a switching element, reference numeral 3 denotes a control circuit, reference numeral 4 denotes a power supply, reference numeral 5 denotes a current detection circuit, reference numeral 6 denotes an on/off circuit, reference numeral 8 denotes a drain current detection circuit, reference numeral 9 denotes an on-period blanking pulse generator circuit, and reference numeral 10 denotes an AND circuit.

The switching control circuit of FIG. 10A includes the switching element 2 having a high potential terminal connected to the inductive load 1 and a low potential terminal connected to a circuit reference potential, the control circuit 3 for controlling the periodic on/off operation of the switching element 2, and the power supply 4 for the control circuit 3. The control circuit 3 includes the current detection circuit 5 for detecting drain current IDS passing through the switching element 2 and the on/off circuit 6. The current detection circuit 5 includes the drain current detection circuit 8, the on-period blanking pulse generator circuit 9, and the AND circuit 10.

The on/off circuit 6 generates a gate signal with a fixed oscillation frequency, applies the gate signal to the control terminal of the switching element 2, and controls the periodic on/off operation of the switching element 2. To be specific, the on/off circuit 6 performs PWM control according to a peak current control scheme based on an output signal OC of the current detection circuit 5. The output signal OC determines the turn-off of the switching element 2. Further, the on/off circuit 6 starts at the rising edge of the gate signal and generates a control signal PULSE whose pulse width is the maximum on period Tonmax of the switching element 2.

The drain current detection circuit 8 connected to the high potential terminal of the switching element 2 detects the drain current IDS according to a detection criterion which can be arbitrarily set or adjusted, and the drain current detection circuit 8 generates an element current detection signal OC_D for turning off the switching element 2. To be specific, when the current value of the drain current IDS is equal to or exceeds the detection criterion specified in the drain current detection circuit 8, the drain current detection circuit 8 sets the element current detection signal OC_D at a high level. The following will describe the case where the drain current detection circuit 8 sets, when the current value of the drain current IDS is equal to or higher than the detection criterion, the element current detection signal OC_D at a high level.

The on-period blanking pulse generator circuit 9 generates, based on the gate signal of the on/off circuit 6, a blanking pulse signal BLK for making the element current detection signal OC_D ineffective for a fixed period (blanking period Tblk) after a transition of the switching element 2 from off state to on state.

The AND circuit 10 ANDs the element current detection signal OC_D from the drain current detection circuit 8 and the blanking pulse signal BLK from the on-period blanking pulse generator circuit 9, and sets the output signal OC at a high level when the signals are both set at a high level.

As described above, the current detection circuit 5 sets the output signal OC at a high level after the lapse of the blanking period Tblk since the switching element 2 is turned on. Therefore, the current detection circuit 5 does not detect capacitive spike noise occurring during the transition of the switching element 2 from off state to on state. Thus the conventional switching control circuit can prevent the switching element 2 from being turned off (malfunction) by the detection of capacitive spike noise.

The switching control circuit of FIG. 10B is identical in configuration to the switching control circuit of FIG. 10A except for a different connection of the detection terminal of the drain current detection circuit 8. The operations of the switching control circuit of FIG. 10B are the same as those of the switching control circuit of FIG. 10A. The following explanation will be given based on the switching control circuit of FIG. 10A.

As described above, the conventional switching control circuit performs PWM control (fixed oscillation frequency) according to a peak current control scheme (for example, Japanese Patent Laid-Open No. 5-276761, Japanese Patent Laid-Open No. 2004-208382, Japanese Patent Laid-Open No. 2004-336860).

However, the conventional switching control circuit has the following problems:

The problems of the conventional switching control circuit will be discussed below with reference to FIGS. 11A, 11B, and 11C which are the operation waveform charts of the conventional switching control circuit. In the conventional switching control circuit, PWM control on the switching element 2 has three states shown in FIGS. 11A, 11B, and 11C.

In FIGS. 11A, 11B, and 11C, Tblk represents a blanking period and Toc represents a detection delay period. The detection delay period is a period from when the drain current detection circuit 8 detects that the drain current IDS is equal to or higher than the detection criterion to when the switching element 2 is actually turned off. Thus the switching element 2 is turned off with a delay of a predetermined period in response to the gate signal generated by the on/off circuit 6.

In FIGS. 11A, 11B, and 11C, PULSE represents the control signal generated in the on/off circuit 6, OC_D represents the element current detection signal generated by the drain current detection circuit 8, OC represents the output signal of the current detection circuit 5, the output signal being generated by the AND circuit 10, BLK represents the blanking pulse signal generated by the on-period blanking pulse generator circuit 9, GATE represents the gate voltage of the switching element 2, IDS represents the drain current passing through the switching element 2, IDSmax represents the maximum value of the drain current IDS specified according to the detection criterion in the drain current detection circuit 8, and IDSmin represents the minimum value of the drain current IDS specified according to the detection criterion in the drain current detection circuit 8.

FIG. 11A shows the switching element 2 under PWM control in a steady state. In this case, the drain current IDS reaches the maximum value IDSmax according to the detection criterion in the drain current detection circuit 8.

FIG. 11B shows that the on period of the switching element 2 is equal to the sum of the blanking period Tblk and the detection delay period Toc (hereinafter, the sum of the blanking period Tblk and the detection delay period Toc will be referred to as the minimum pulse period). In this case, the drain current IDS reaches the minimum value IDSmin according to the detection criterion in the drain current detection circuit 8.

FIG. 11C shows that the on period of the switching element 2 is equal to the minimum pulse period and the drain current IDS largely exceeding the maximum value IDSmax passes during the on period. The drain current IDS largely exceeding the maximum value IDSmax passes because when the on period of the switching element 2 is equal to the minimum pulse period, the current detection circuit 5 does not detect the drain current IDS and the on/off circuit 6 cannot perform PWM control on the switching element 2.

As described above, in the conventional switching control circuit, when the on period of the switching element 2 is equal to the minimum pulse period, the drain current IDS largely exceeding the maximum value IDSmax may pass during the on period. Such excessive current passing through the switching element 2 may cause degradation (breakage in some cases) of the switching element 2.

The following will discuss a problem caused by the conventional switching control circuit used for, for example, a switching power supply shown in FIG. 12. In FIG. 12, reference numeral 11 denotes a snubber circuit, reference numeral 12 denotes a transformer, reference numeral 13 denotes a diode, and reference numeral 14 denotes a capacitor.

In the conventional switching power supply, the snubber circuit 11 and the primary side of the transformer 12 are connected to the conventional switching control circuit, and a rectifying/smoothing circuit made up of the diode 13 and the capacitor 14 is connected to the secondary side of the transformer 12. Output terminals OUTPUT and RETURN are connected to the capacitor 14.

Further, the conventional switching power supply includes an output voltage detection circuit (not shown) connected to the output terminal OUTPUT. The output voltage detection circuit detects the voltage of the output terminal OUTPUT and generates a detection signal for adjusting the detection criterion of the drain current detection circuit 8 according to the value of the detected voltage. PWM control on the switching element 2 is performed in response to the detection signal of the output voltage detection circuit.

In the conventional switching power supply, energy (power) generated on the secondary side of the transformer 12 is supplied to the diode 13 and the capacitor 14 in response to the switching operation (periodic on/off operation) of the switching element 2. The diode 13 and the capacitor 14 rectify and smooth the voltage from the transformer 12 to generate output voltage OUT, and output the output voltage OUT from the output terminal.

FIG. 13 shows the operation waveforms of the conventional switching power supply when terminal voltage VIN of an input terminal INPUT gradually increases, for example, immediately after power is turned on. In FIG. 13, VIN represents an input voltage inputted to the input terminal INPUT, OUT represents an output voltage outputted from the output terminal, and ID represents a secondary side current passing through the diode 13.

As shown in FIG. 13, when the terminal voltage (input voltage) VIN of the input terminal INPUT gradually increases, the switching element 2 is controlled in response to the control signal PULSE. The inclination of the drain current IDS passing through the switching element 2 (inclination after the passage of capacitive spike current) increases in proportion to the input voltage VIN. For this reason, in the switching power supply using the conventional switching control circuit, when the input voltage VIN gradually increases as shown in FIG. 13, the on period of the switching element 2 is equal to the minimum pulse period, PWM control on the switching element 2 is disabled, and the peak value of the drain current IDS increases every time the switching element 2 is periodically turned on/off. The peak value of the drain current IDS increases because when the switching element 2 is turned off, all energy accumulated in the transformer 12 remains as it is without being supplied to the diode 13 or the capacitor 14, and the energy increases every time the switching element 2 is periodically turned on/off. Such an increase in the peak value of the drain current IDS may cause degradation (breakage in some cases) of the switching element 2, so that the reliability and life of the switching power supply may be adversely affected.

The following will discuss a problem of the conventional switching control circuit used for, for example, an LED driver shown in FIG. 14. In FIG. 14, reference numeral 15 denotes an LED device and reference numeral 16 denotes a diode. The LED device 15 includes a protective device for improving surge tolerance. In the LED driver, the LED device 15 and the diode 16 are connected to the conventional switching control circuit. The conventional LED driver has an FB terminal. The detection criterion of the drain current IDS passing through the switching element 2 can be changed from the outside through the FB terminal.

FIG. 15 shows the operation waveforms of the conventional LED driver when the luminance of the LED is adjusted by gradually reducing the peak value of the drain current IDS passing through the switching element 2. In FIG. 15, VIN represents an input voltage inputted to the input terminal INPUT, VFB represents a terminal voltage of the FB terminal, and IL represents a current passing through the inductive load 1.

In the LED driver using the conventional switching control circuit, in order to gradually reduce, as indicated by reference numeral 17 in FIG. 15, the peak value of the drain current IDS passing through the switching element 2, the terminal voltage VFB is gradually reduced as shown FIG. 15 so as to gradually reduce the detection criterion. In this case, when the on period of the switching element 2 is equal to the minimum pulse period, the conventional LED driver cannot shorten the on period any more. Therefore in the conventional LED driver, the luminance of the LED cannot be set at a certain value or lower, so that the dimming range is reduced and poor dimming occurs.

DISCLOSURE OF THE INVENTION

In view of the problems, an object of the present invention is to provide a switching control circuit which can increase the off period of a switching element 2 when the on period of the switching element is equal to the minimum pulse period.

In order to attain the object, the switching control circuit of the present invention comprises an off period adjusting circuit for generating an adjusting signal for adjusting the off period of a switching element according to the on period of the switching element, and an on/off circuit for generating a gate signal (switching control signal) for controlling the periodic on/off operation of the switching element based on the adjusting signal, an element current detection signal OC_D generated by a drain current detection circuit (element current detection circuit), and a blanking pulse signal BLK (blanking signal) generated by an on-period blanking pulse generator circuit (blanking signal generator circuit).

To be specific, the switching control circuit of the present invention comprises:

a switching element having a high potential terminal, a low potential terminal, and a control terminal, the high potential terminal being connected to an inductive load, the low potential terminal being connected to a circuit reference potential, the switching element being turned on/off in response to a switching control signal applied to the control terminal, an element current detection circuit for detecting element current passing through the switching element according to a detection criterion, thereby generating an element current detection signal for turning off the switching element, a blanking signal generator circuit for generating a blanking signal for making the element current detection signal ineffective for a fixed period after the switching element is switched from off state to on state, an off period adjusting circuit for generating, based on the element current detection signal and the blanking signal, an adjusting signal for adjusting the off period of the switching element according to the on period of the switching element, and an on/off circuit for generating, based on the element current detection signal, the blanking signal, and the adjusting signal, the switching control signal for controlling the periodic on/off operation of the switching element.

According to the switching control circuit of the present invention, the on/off circuit has a switch for switching the off period of the switching element to a predetermined off period, and the off period adjusting circuit controls the switch in response to the adjusting signal to switch the off period of the switching element to the predetermined off period when the element current detection circuit detects the element current for a predetermined period or longer in a fixed period during which the element current detection signal is made ineffective in response to the blanking signal.

Further, according to the switching control circuit of the present invention, the off period adjusting circuit generates the adjusting signal for making the off period of the switching element proportionate to the period during which the element current detection circuit detects the element current in the fixed period during which the element current detection signal is made ineffective in response to the blanking signal.

The switching control circuit of the present invention makes it possible to increase the off period of the switching element when the on period of the switching element is equal to the minimum pulse period.

Thus, when using the switching control circuit of the present invention for a switching power supply, an increase in the peak value of the element current is considerably reduced as compared with the prior art (FIGS. 7 and 13). The peak value of the element current increases every time the switching element is periodically turned on/off. Therefore, the switching control circuit of the present invention can reduce or prevent degradation (breakage in some cases) of the switching element of the switching power supply, thereby increasing the reliability and life of the switching power supply.

When using the switching control circuit of the present invention for an LED driver, the peak value of the element current further decreases according to the terminal voltage VFB of the FB terminal (FIGS. 9 and 15). The element current occurs every time the switching element is periodically turned on/off. Therefore, according to the switching control circuit of the present invention, the luminance of the LED in the LED driver can be further reduced, so that the dimming range is increased and poor dimming can be prevented.

As described above, the switching control circuit of the present invention makes it possible to improve the reliability, service life, and function of devices using the switching control circuit.

DESCRIPTION OF THE EMBODIMENT

Figure 1A:
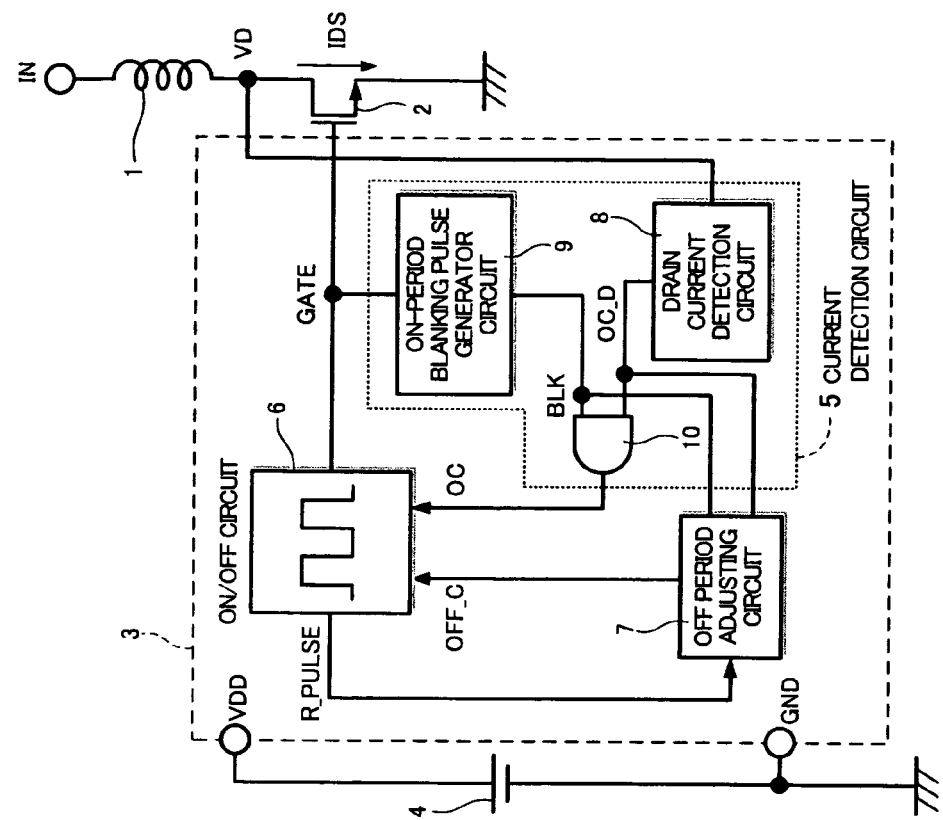
FIGS. 1A and 1B are block diagrams each schematically showing a switching control circuit according to an embodiment of the present invention.
Figure 1B:
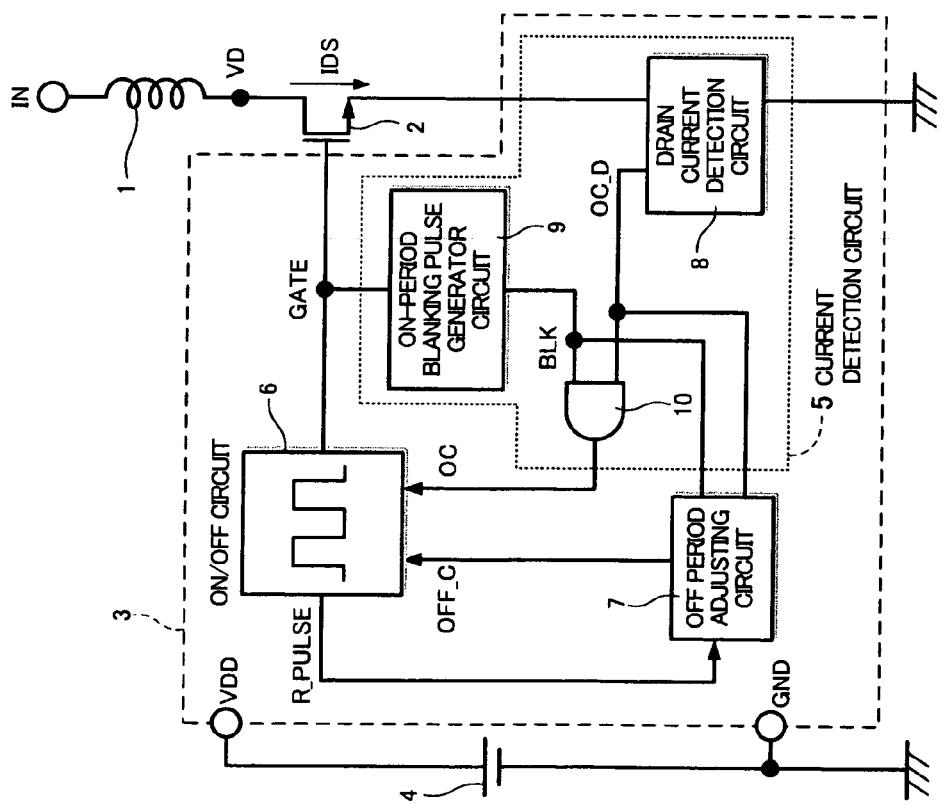

An embodiment of the present invention will be described below. FIGS. 1A and 1B are block diagrams schematically showing switching control circuits according to the present embodiment. In FIGS. 1A and 1B, reference numeral 1 denotes an inductive load, reference numeral 2 denotes a switching element, reference numeral 3 denotes a control circuit, reference numeral 4 denotes a power supply, reference numeral 5 denotes a current detection circuit, reference numeral 6 denotes an on/off circuit, reference numeral 7 denotes an off period adjusting circuit, reference numeral 8 denotes a drain current detection circuit (element current detection circuit), reference numeral 9 denotes an on-period blanking pulse generator circuit (blanking signal generator circuit), and reference numeral 10 denotes an AND circuit.

The switching control circuit of FIG. 1A includes the switching element 2 having a high potential terminal connected to the inductive load 1 and a low potential terminal connected to a circuit reference potential, the control circuit 3 for controlling the periodic on/off operation of the switching element 2, and the power supply 4 for the control circuit 3. The present embodiment will describe power supply from the outside as an example of a method of supplying power to the control circuit 3. The power supply method is not limited to this method.

The control circuit 3 includes the current detection circuit 5 for detecting drain current (element current) IDS passing through the switching element 2, the on/off circuit 6, and the off period adjusting circuit 7. The current detection circuit 5 includes the drain current detection circuit 8, the on-period blanking pulse generator circuit 9, and the AND circuit 10.

The current detection circuit 5 has the function of detecting the drain current IDS according to a detection criterion specified in the circuit and the function of disabling detection of the drain current IDS for a fixed period (blanking period Tblk) since the switching element 2 is switched from off state to on state. The current detection circuit 5 detects the drain current IDS after the blanking period Tblk.

The on/off circuit 6 generates a gate signal (switching control signal) with a variable oscillation frequency and applies the gate signal to the control terminal of the switching element 2, so that the periodic on/off operation of the switching element 2 is controlled. To be specific, the on/off circuit 6 performs PWM control (fixed oscillation frequency) according to a peak current control scheme based on an output signal OC of the current detection circuit 5. The output signal OC determines the turn-off of the switching element 2. On the other hand, the on/off circuit 6 turns off the switching element 2 based on the output signal OC of the current detection circuit 5 when the on period of the switching element 2 is equal to the minimum pulse period. Further, the on/off circuit 6 changes the frequency of the gate signal based on an adjusting signal OFF_C generated by the off period adjusting circuit 7 and increases the off period of the switching element 2.

The on/off circuit 6 starts at the rising edge of the gate signal and generates a control signal PULSE whose pulse width is the maximum on period Tonmax of the switching element 2. Further, the on/off circuit 6 generates a signal R_PULSE rising at the rising edge of the gate signal.

The off period adjusting circuit 7 generates the adjusting signal OFF_C for adjusting the off period of the switching element 2 according to the on period of the switching element 2, based on an element current detection signal OC_D generated by the drain current detection circuit 8, a blanking pulse signal (blanking signal) BLK generated by the on-period blanking pulse generator circuit 9, and the signal R_PULSE generated by the on/off circuit 6.

The drain current detection circuit 8 connected to the low potential terminal of the switching element 2 detects the drain current (element current) IDS according to the detection criterion which can be arbitrarily set or adjusted, and generates the element current detection signal OC_D to turn off the switching element 2. To be specific, when the current value of the drain current IDS is equal to or exceeds the detection criterion specified in the drain current detection circuit 8, the drain current detection circuit 8 sets the element current detection signal OC_D at a high level. The following will describe the case where the drain current detection circuit 8 sets, when the current value of the drain current IDS is equal to or higher than the detection criterion, the element current detection signal OC_D at a high level.

The on-period blanking pulse generator circuit 9 generates, based on the gate signal of the on/off circuit 6, the blanking pulse signal BLK for making the element current detection signal OC_D ineffective for a fixed period (blanking period Tblk) after the switching element 2 is switched from off state to on state.

The AND circuit 10 for generating the output signal OC of the current detection circuit 5 ANDs the element current detection signal OC_D and the blanking pulse signal BLK, and sets the output signal OC at a high level when the signals are both set at a high level.

As described above, the current detection circuit 5 sets the output signal OC at a high level after the lapse of the blanking period Tblk since the switching element 2 is turned on. Therefore, the current detection circuit 5 does not detect capacitive spike noise occurring during a transition of the switching element 2 from off state to on state. Thus the switching control circuit can prevent the switching element 2 from being turned off (malfunction) by the detection of capacitive spike noise.

The switching control circuit of FIG. 1B is identical in configuration to the switching control circuit of FIG. 1A except for a different connection of the detection terminal of the drain current detection circuit 8. The operations of the switching control circuit of FIG. 1B are also the same as those of the switching control circuit of FIG. 1A. To be specific, in the switching control circuit of FIG. 1A, the detection terminal of the drain current detection circuit 8 is connected to the low potential terminal of the switching element 2, whereas in the switching control circuit of FIG. 1B, the detection terminal of the drain current detection circuit 8 is connected to the high potential terminal of the switching element 2. The following explanation will be given based on the switching control circuit of FIG. 1A.

Figure 2:
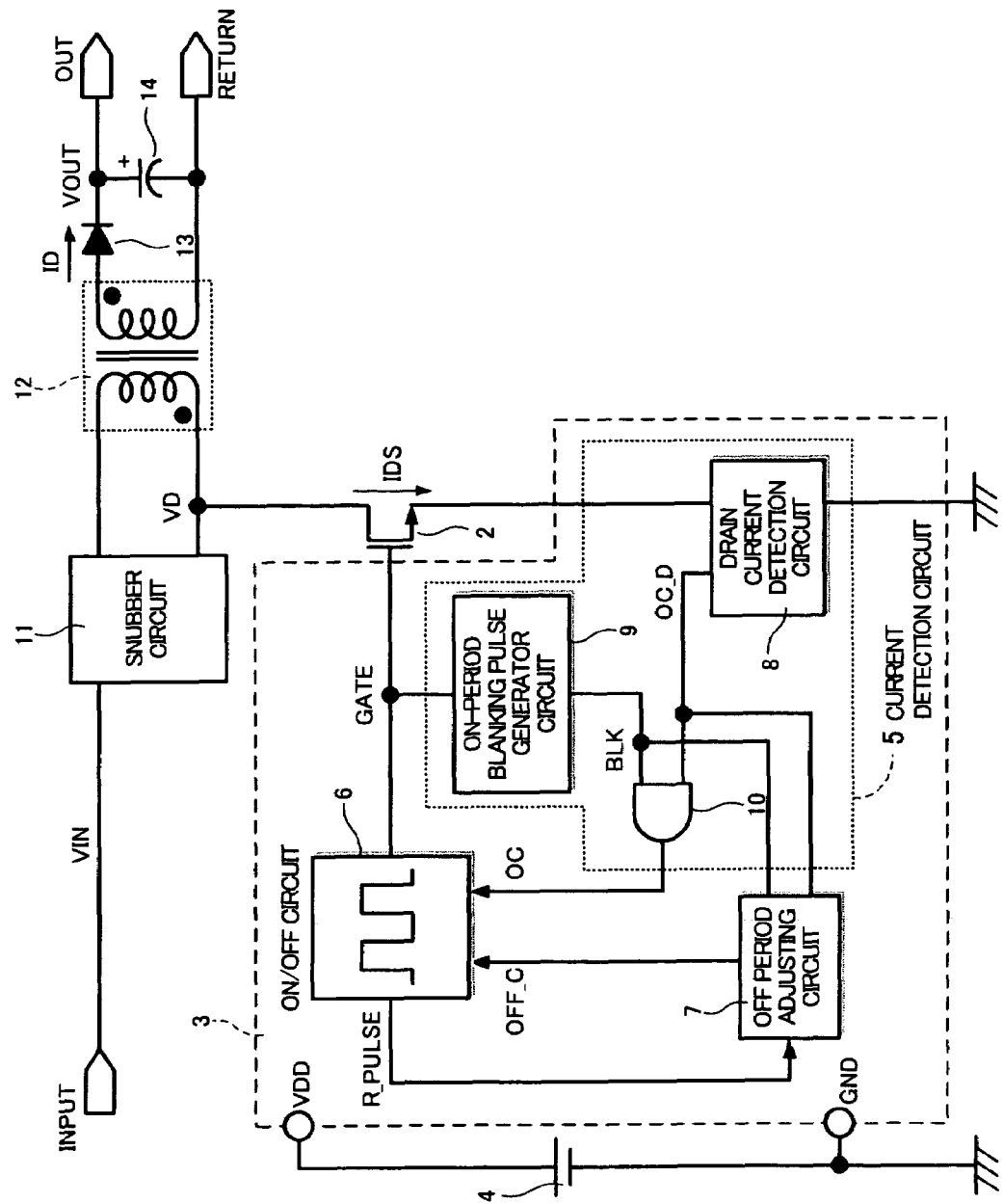
FIG. 2 is a block diagram schematically showing a switching power supply using the switching control circuit according to the embodiment of the present invention.

The following will discuss the operations of the switching control circuit of the present embodiment. In the following example, the switching control circuit is used for a switching power supply. FIG. 2 is a block diagram schematically showing the switching power supply. In FIG. 2, reference numeral 11 denotes a snubber circuit, reference numeral 12 denotes a transformer, reference numeral 13 denotes a diode, and reference numeral 14 denotes a capacitor.

In the switching power supply, the snubber circuit 11 and the primary side of the transformer 12 are connected to the switching control circuit of the present embodiment, and a rectifying/smoothing circuit made up of the diode 13 and the capacitor 14 is connected to the secondary side of the transformer 12. Output terminals OUTPUT and RETURN are connected to the capacitor 14.

Further, the switching power supply of the present embodiment includes an output voltage detection circuit (not shown) connected to the output terminal OUTPUT. The output voltage detection circuit detects the voltage of the output terminal OUTPUT and generates a detection signal for adjusting the detection criterion of the drain current detection circuit 8 according to the value of the detected voltage. PWM control on the switching element 2 is performed in response to the detection signal of the output voltage detection circuit.

In the switching power supply, energy (power) generated on the secondary side of the transformer 12 is supplied to the diode 13 and the capacitor 14 in response to the switching operation (periodic on/off operation) of the switching element 2. The diode 13 and the capacitor 14 rectify and smooth voltage from the transformer 12 to generate output voltage OUT, and output the output voltage OUT from the output terminal.

Figure 3:
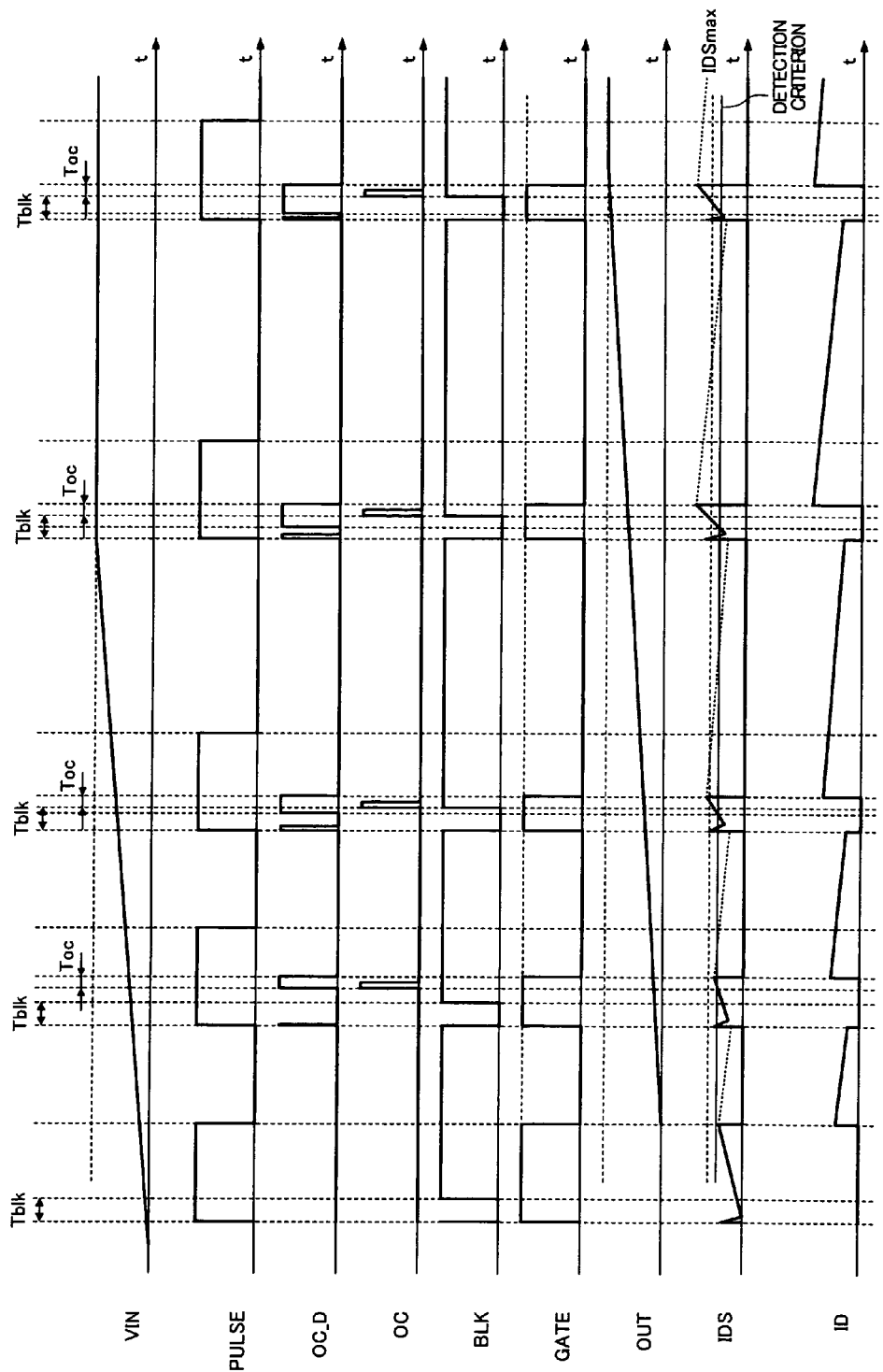
FIG. 3 is a diagram showing the operation waveforms of the switching power supply using the switching control circuit according to the embodiment of the present invention.

FIG. 3 shows the operation waveforms of the switching power supply of the present embodiment when terminal voltage VIN of an input terminal INPUT gradually increases, for example, immediately after power is turned on. In FIG. 3, Tblk represents a blanking period and Toc represents a detection delay period. The detection delay period is a period from when the drain current detection circuit 5 detects that the drain current IDS is equal to or higher than the detection criterion to when the switching element 2 is actually turned off. Thus the switching element 2 is turned off with a delay of a predetermined period in response to the gate signal generated by the on/off circuit 6.

VIN represents an input voltage inputted to the input terminal INPUT. PULSE represents a control signal generated in the on/off circuit 6. OC_D represents the element current detection signal generated by the drain current detection circuit 8. OC represents the output signal of the current detection circuit 5, the output signal being generated by the AND circuit 10. BLK represents the blanking pulse signal generated by the on-period blanking pulse generator circuit 9. GATE represents the gate voltage of the switching element 2. OUT represents an output voltage outputted from the output terminal. IDS represents the drain current passing through the switching element 2. ID represents a secondary side current passing through the diode 13. IDSmax represents the maximum value of the drain current IDS specified according to the detection criterion in the drain current detection circuit 8.

Figure 13:
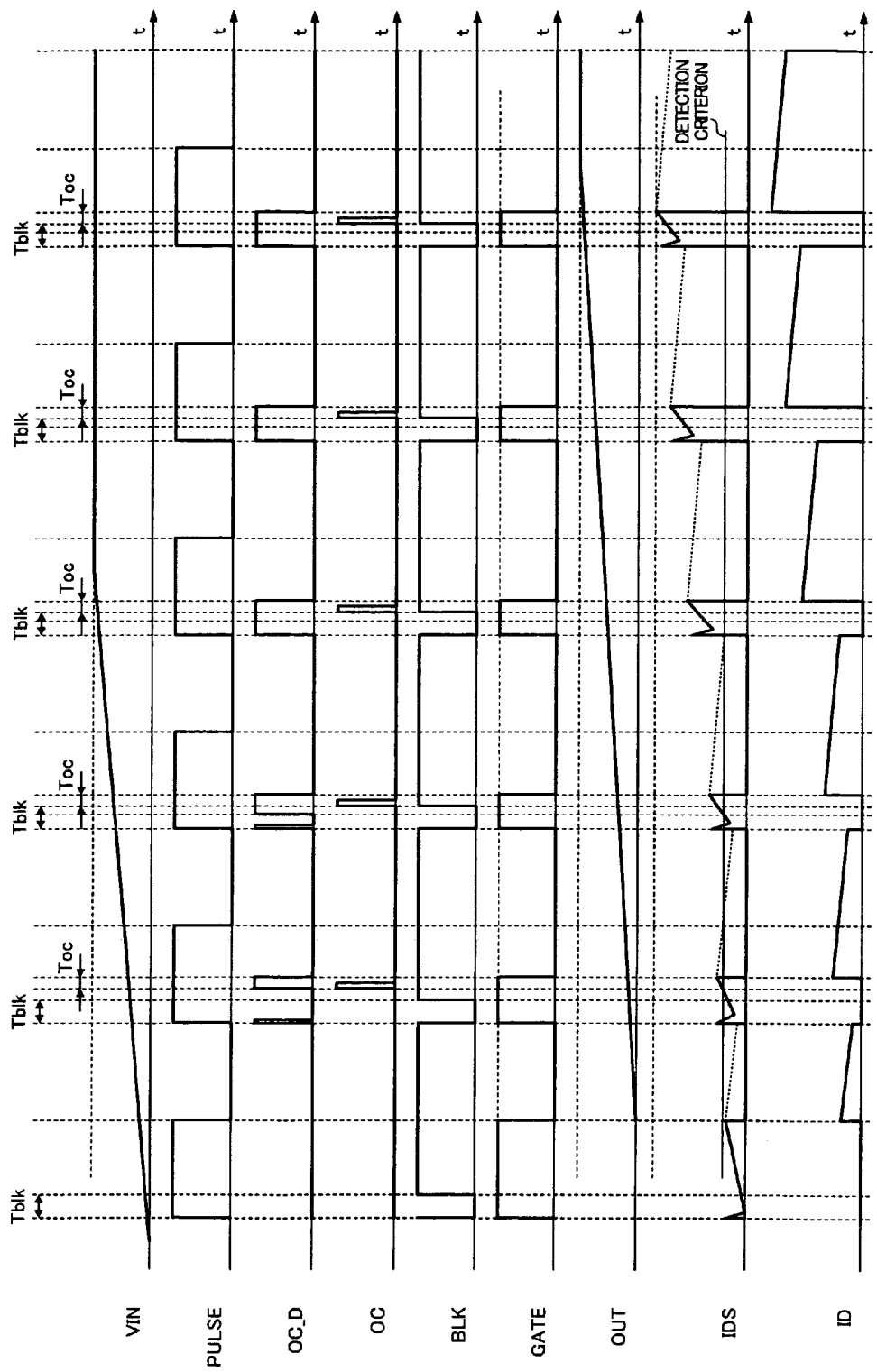
FIG. 13 is a diagram showing the operation waveforms of the conventional switching power supply.
Figure 14:
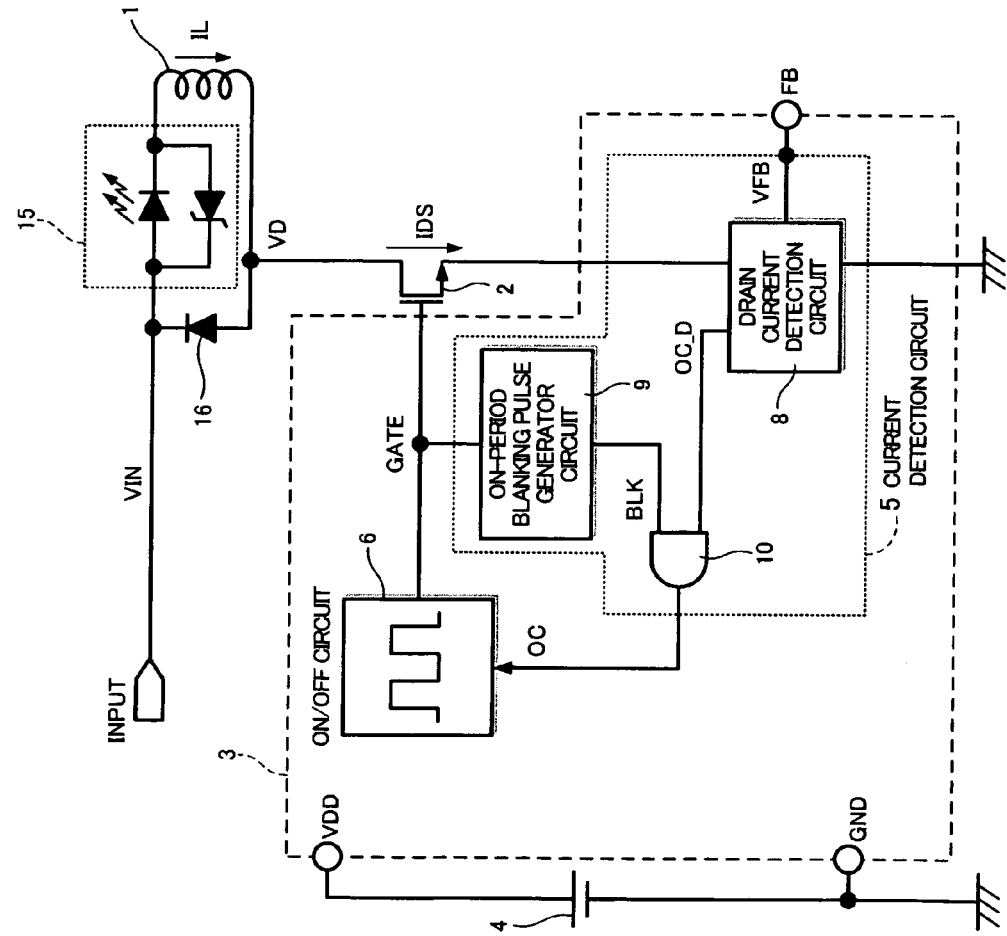
FIG. 14 is a block diagram schematically showing an LED driver using the conventional switching control circuit.

As shown in FIG. 3, in the switching power supply using the switching control circuit of the present embodiment, when the terminal voltage (input voltage) of the input terminal INPUT gradually increases, the on period of the switching element 2 decreases. When the on period is equal to the minimum pulse period, the off period of the switching element 2 is increased in response to the adjusting signal OFF_C generated by the off period adjusting circuit 7. Thus when the switching element 2 is turned off, energy remaining in the transformer 12 decreases, so that an increase in the peak value of the drain current IDS is considerably reduced as compared with the prior art (FIG. 13). The drain current IDS increases every time the switching element 2 is periodically turned on/off. Therefore, the switching control circuit of the present embodiment can reduce or prevent degradation (breakage in some cases) of the switching element 2 of the switching power supply, thereby increasing the reliability and life of the switching power supply.

Figure 4:
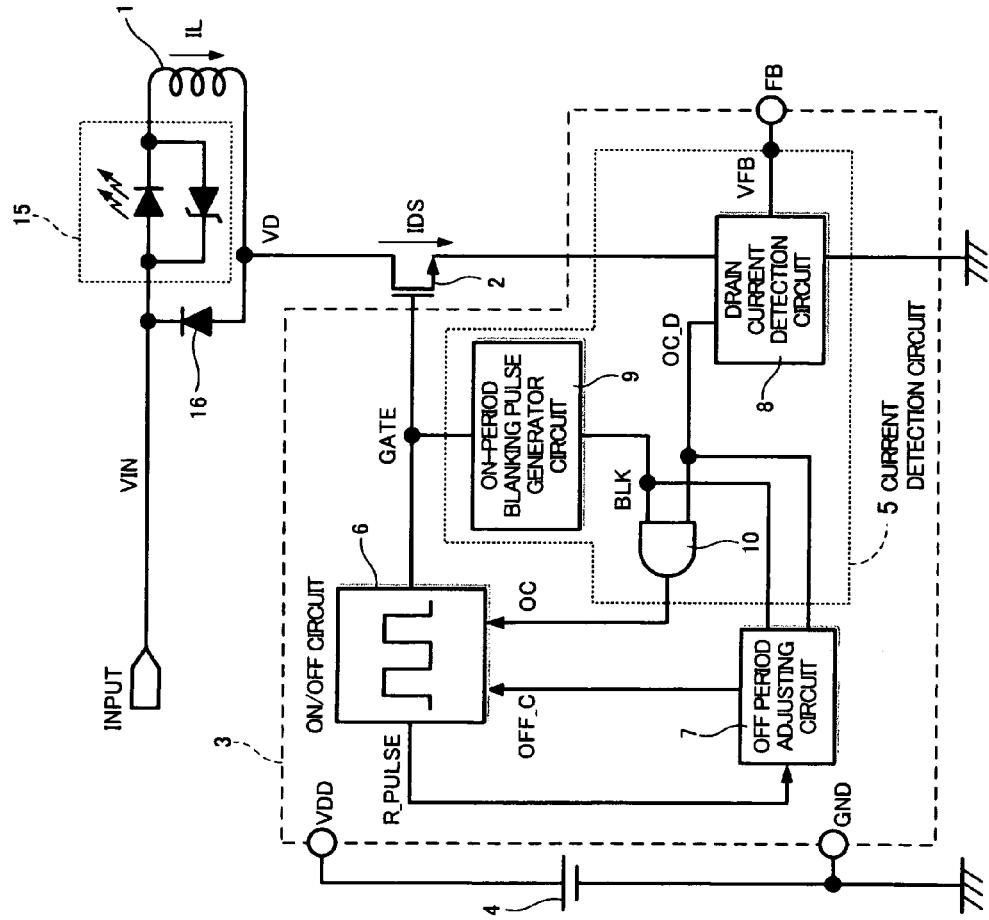
FIG. 4 is a block diagram schematically showing an LED driver using the switching control circuit according to the embodiment of the present invention.

The following will discuss the operations of the switching control circuit of the present embodiment. In this example, the switching control circuit is used for an LED driver. FIG. 4 is a block diagram schematically showing the LED driver. In FIG. 4, reference numeral 15 denotes an LED device and reference numeral 16 denotes a diode. The LED device 15 includes a protective device for improving surge tolerance. In this LED driver, the LED device 15 and the diode 16 are connected to the switching control circuit of the present embodiment. Further, the LED driver has an FB terminal. The detection criterion of the drain current IDS passing through the switching element 2 can be changed from the outside through the FB terminal.

Figure 5:
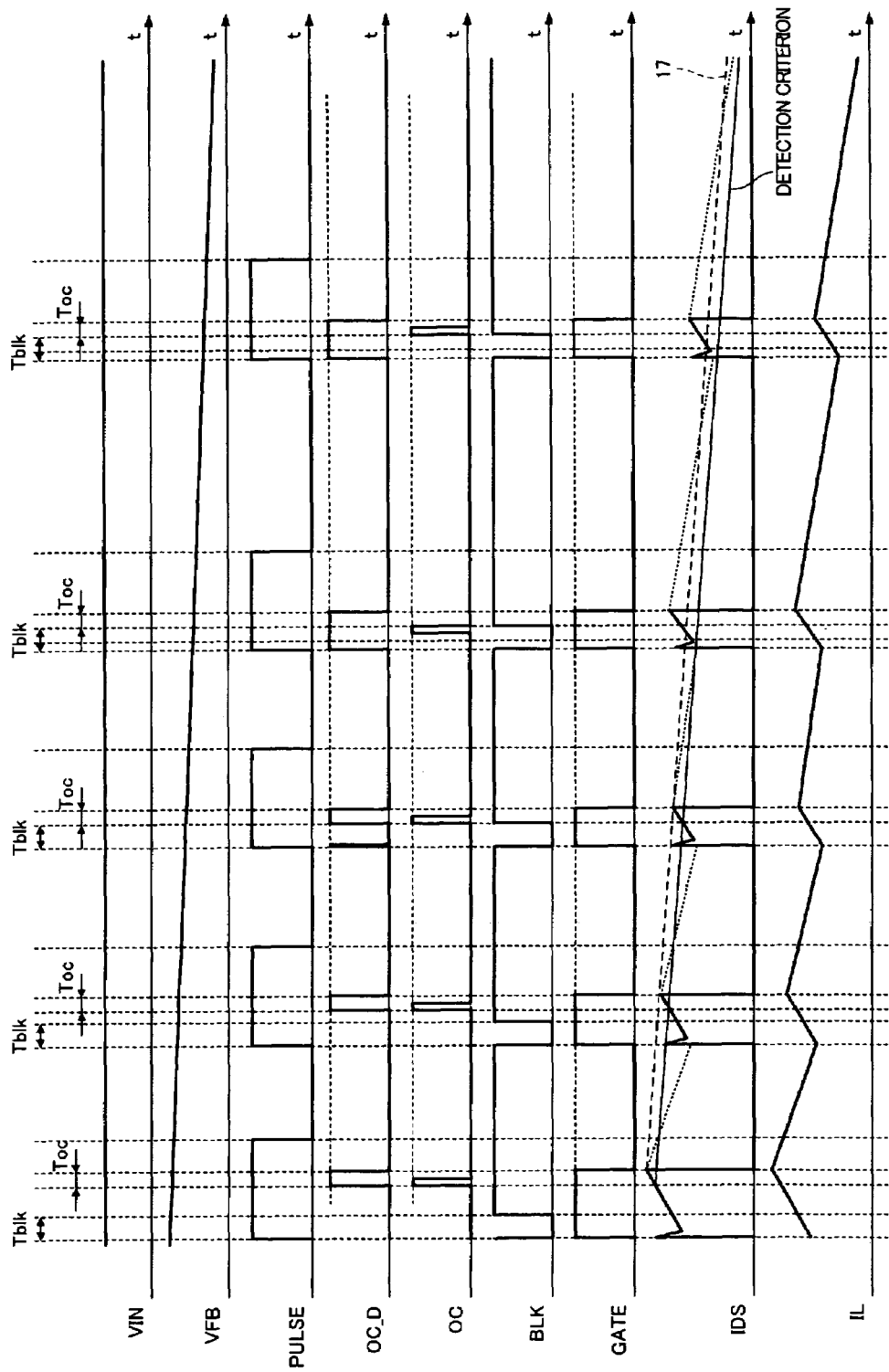
FIG. 5 is a diagram showing the operation waveforms of the LED driver using the switching control circuit according to the embodiment of the present invention.

FIG. 5 shows the operation waveforms of the LED driver of the present embodiment when the luminance of the LED is adjusted by gradually reducing the peak value of the drain current IDS passing through the switching element 2. In FIG. 5, VFB represents the terminal voltage of the FB terminal and IL represents a current passing through the inductive load 1.

Figure 15:
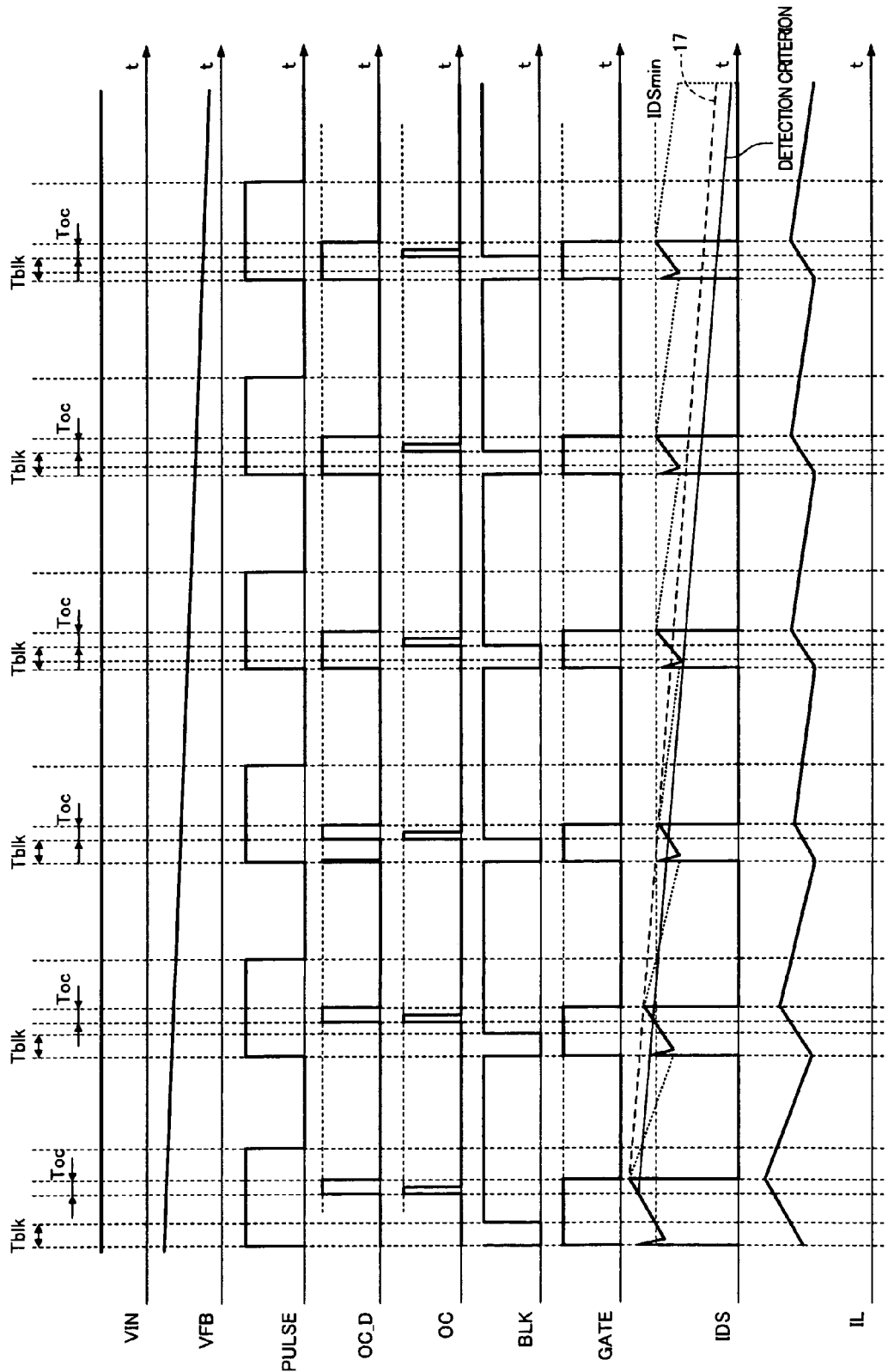
FIG. 15 is a diagram showing the operation waveforms of the conventional LED driver.

In the LED driver using the switching control circuit of the present embodiment, in order to gradually reduce, as indicated by reference numeral 17 in FIG. 5, the peak value of the drain current IDS passing through the switching element 2, the terminal voltage VFB of the FB terminal is gradually reduced as shown FIG. 5 so as to gradually reduce the detection criterion. In this case, when the on period of the switching element 2 is equal to the minimum pulse period, the off period of the switching element 2 is increased in response to the adjusting signal OFF_C generated by the off period adjusting circuit 7. Thus energy stored in the inductive load 1 is consumed for a longer time by a closed circuit made up of the inductive load 1, the LED device 15, and the diode 16, so that the peak value of the drain current IDS further decreases according to the terminal voltage VFB of the FB terminal (FIG. 15). The drain current IDS occurs every time the switching element 2 is periodically turned on/off. According to the switching control circuit of the present embodiment, the luminance of the LED in the LED driver can be further reduced, so that the dimming range is increased and poor dimming can be prevented.

Figure 6:
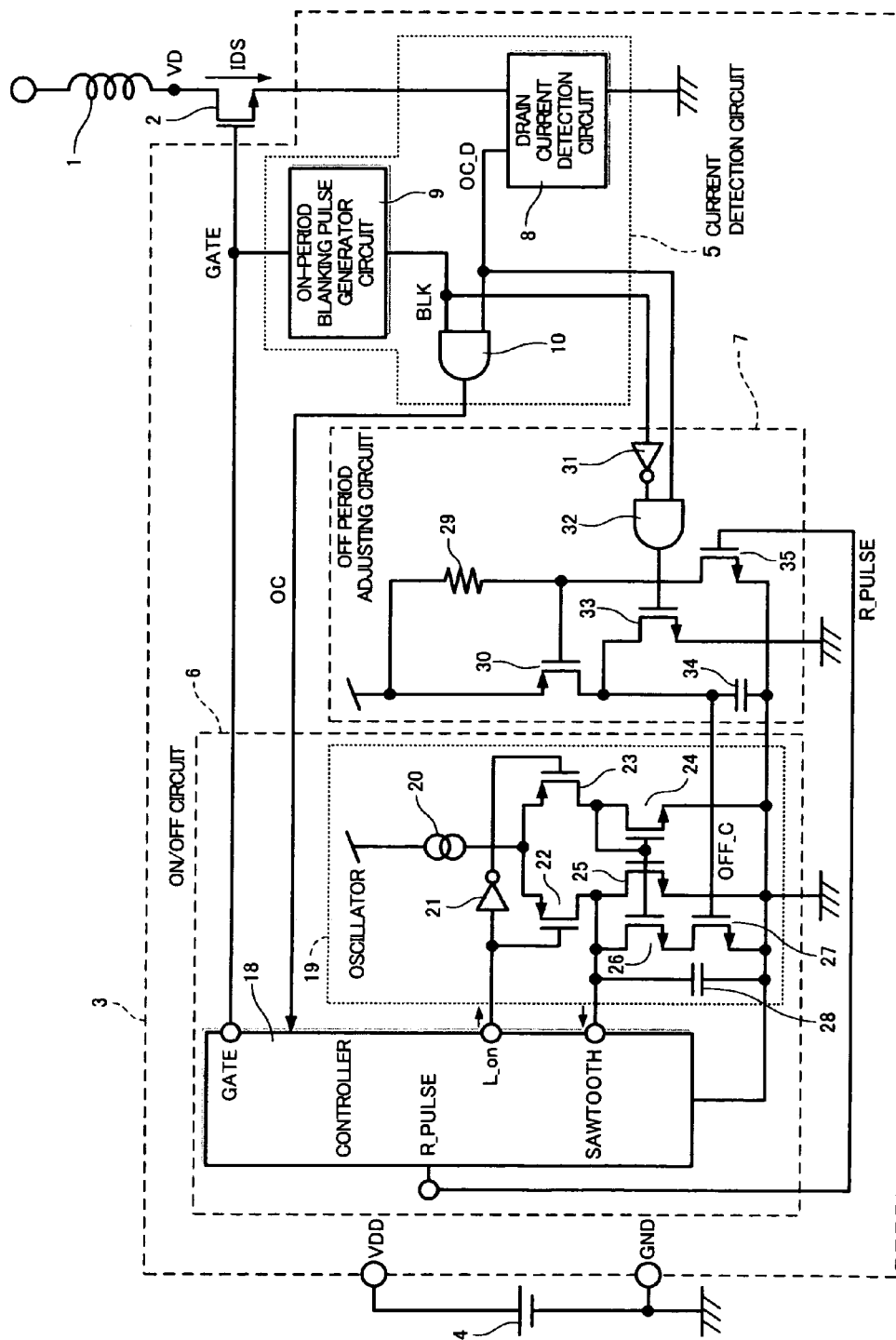
FIG. 6 is a circuit diagram showing a specific example of an on/off circuit and an off period adjusting circuit which are included in the switching control circuit according to the embodiment of the present invention.

The following will discuss a specific example of the on/off circuit 6 and the off period adjusting circuit 7. FIG. 6 shows specific circuits of the on/off circuit 6 and the off period adjusting circuit 7 in the control circuit 3 of the switching control circuit of the present embodiment.

In this specific example, the on/off circuit 6 has a switch for switching the off period of the switching element 2 to a predetermined off period. When the drain current detection circuit 8 detects the drain current IDS for a predetermined period or longer in a fixed period (blanking period Tblk) during which the element current detection signal OC_D is made ineffective in response to the blanking pulse signal BLK, the off period adjusting circuit 7 controls the switch in response to the adjusting signal OFF_C to switch the off period of the switching element 2 to the predetermined off period. The predetermined off period is set longer than the off period when the on period of the switching element 2 is equal to the minimum pulse period in a steady state.

In FIG. 6, reference numeral 18 denotes a controller and reference numeral 19 denotes an oscillator for generating a triangular wave SAWTOOTH. Reference numeral 20 denotes a constant current source, reference numerals 21 and 31 denote inverters, reference numerals 22, 23 and 30 denote P-type MOSFETs, reference numerals 24, 25, 26, 27, 33 and 35 denote N-type MOSFETs, reference numerals 28 and 34 denote capacitors, reference numeral 29 denotes a resistor, and reference numeral 32 denotes an AND circuit.

The oscillator 19 includes the constant current source 20, the inverter 21, the P-type MOSTFETs 22 and 23, the N-type MOSFETs 24 to 27, and the capacitor 28. The off period adjusting circuit 7 includes the resistor 29, the P-type MOSFET 30, the inverter 31, the AND circuit 32, the N-type MOSFETs 33 and 35, and the capacitor 34.

The oscillator 19 generates the triangular wave SAWTOOTH by charging/discharging the capacitor 28. In the switching control circuit of the present embodiment, the off period of the switching element 2 is adjusted by adjusting the fall period (the discharge period of the capacitor 28) of the triangular wave SAWTOOTH. In this case, the oscillator 19 has the N-type MOSFET 27 as a switch for switching the off period. When the N-type MOSFET 27 is turned off, the off period of the switching element 2 is switched to the predetermined off period.

The off period adjusting circuit 7 generates the adjusting signal OFF_C by charging/discharging the capacitor 34. The adjusting signal OFF_C is applied to the control terminal of the N-type MOSFET 27 in the oscillator 19. The turn-on/off of the N-type MOSFET 27 is controlled in response to the adjusting signal OFF_C.

The controller 18 starts at the rising edge of the triangular wave SAWTOOTH and generates the control signal PULSE whose pulse width is the maximum on period Tonmax of the switching element 2. Further, the controller 18 generates a gate signal which rises at the rising edge of the triangular wave SAWTOOTH and falls at the rising edge of the output signal OC of the current detection circuit 5 or falls at the falling edge of the control signal PULSE. Even when the gate signal falls, the drain current IDS keeps flowing until the gate voltage GATE of the control terminal of the switching element 2 reaches a threshold value. A period during which the gate signal falls, the gate voltage GATE reaches the threshold value, and the switching element 2 is turned off is a detection delay period. Further, the controller 18 generates a signal R_PULSE rising at the rising edge of the triangular wave SAWTOOTH. Moreover, the controller 18 generates a signal L_on which falls at the rising edge of the triangular wave SAWTOOTH and rises after a fixed period of time.

The oscillator 19 charges the capacitor 28 while the output signal L_on of the controller 18 is at a low level, and the oscillator 19 discharges the capacitor 28 while the output signal L_on of the controller 18 is at a high level, so that the triangular wave SAWTOOTH is generated. The on/off of the N-type MOSFET 27 is controlled in response to the adjusting signal OFF_C of the off period adjusting circuit 7, so that the discharge period of the capacitor 28 can be changed. To be specific, when the switching element 2 is under PWM control in a steady state, the N-type MOSFET 27 is turned on. On the other hand, when the on period of the switching element 2 is equal to the minimum pulse period, the N-type MOSFET 27 is turned off and the discharge period of the capacitor 28 is increased.

The capacitor 34 of the off period adjusting circuit 7 generates the adjusting signal OFF_C of high level with the switching element 2 under PWM control in a steady state. When the drain current IDS is equal to or higher than the detection criterion in the blanking period Tblk, the N-type MOSFET 33 is turned on in response to the blanking pulse signal BLK of the on-period blanking pulse generator circuit 9 and the element current detection signal OC_D of the drain current detection circuit 8, so that the capacitor 34 is discharged. When the discharge continues for a predetermined period or longer, the adjusting signal OFF_C is set at a low level. Further, when the output signal R_PULSE of the controller 18 is set at a high level, the N-type MOSFETs 30 and 35 are turned on to charge the capacitor 34 and the adjusting signal OFF_C is set at a high level.

Figure 7:
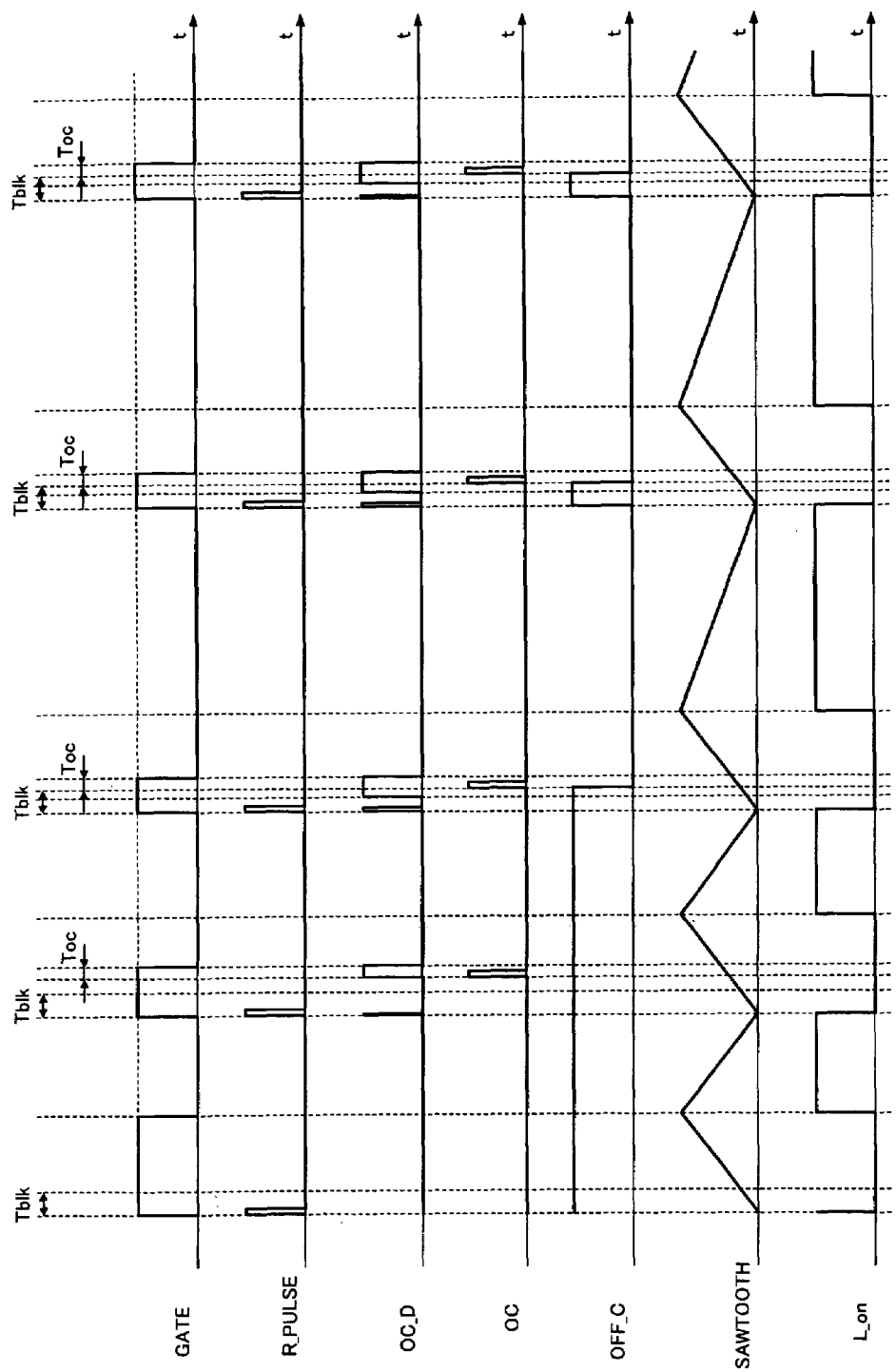
FIG. 7 is a diagram showing the operation waveforms of the switching control circuit according to the embodiment of the present invention.

The following will discuss operations when the switching control circuit configured thus is used for the switching power supply shown in FIG. 2. FIG. 7 shows the operation waveforms of the switching power supply when the terminal voltage VIN of the input terminal INPUT gradually increases.

As shown in FIG. 7, in the case of the switching element 2 under PWM control in a steady state, the triangular wave SAWTOOTH has a constant oscillation frequency and ordinary PWM control is performed. On the other hand, when the on period of the switching element 2 is equal to the minimum pulse period, the adjusting signal OFF_C of the off period adjusting circuit 7 is set at a low level, the fall period of the triangular wave SAWTOOTH is increased, and the off period of the switching element 2 is increased.

Figure 8:
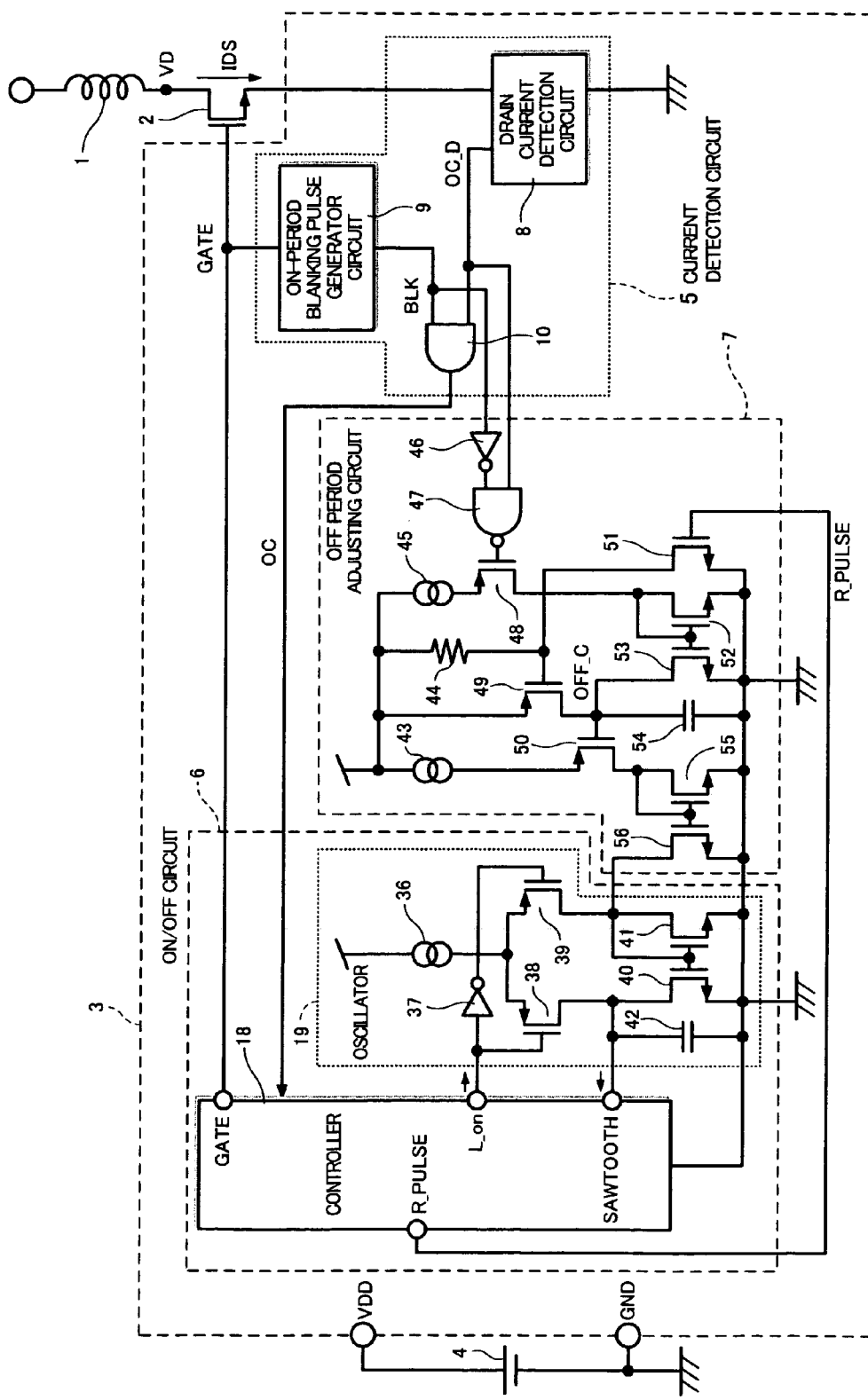
FIG. 8 is a circuit diagram showing a specific example of the on/off circuit and the off period adjusting circuit which are included in the switching control circuit according to the embodiment of the present invention.

The following will discuss another specific example of the on/off circuit 6 and the off period adjusting circuit 7. FIG. 8 shows another specific circuits of the on/off circuit 6 and the off period adjusting circuit 7 in the control circuit 3 of the switching control circuit of the present embodiment.

In this specific example, the off period adjusting circuit 7 generates the adjusting signal OFF_C for making the length of the off period of the switching element 2 proportionate to the length of a period during which the drain current detection circuit 8 detects the drain current IDS in a fixed period (blanking period Tblk) during which the element current detection signal OC_D is made ineffective in response to the blanking pulse signal BLK.

In FIG. 8, reference numerals 36, 43 and 45 denote constant current sources, reference numerals 37 and 46 denote inverters, reference numerals 38, 39, 48, 49 and 50 denote P-type MOSFETs, reference numerals 40, 41, 51, 52, 53, 55 and 56 denote N-type MOSFETs, reference numerals 42 and 54 denote capacitors, reference numeral 44 denotes a resistor, and reference numeral 47 denotes an NAND circuit.

The oscillator 19 includes the constant current source 36, the inverter 37, the P-type MOSTFETs 38 and 39, the N-type MOSFETs 40 and 41, and the capacitor 42. The off period adjusting circuit 7 includes the constant current sources 43 and 44, the resistor 44, the inverter 46, the NAND circuit 47, the P-type MOSFETs 48 to 50, the N-type MOSFETs 51 to 53, 55 and 56, and the capacitor 54.

The oscillator 19 generates the triangular wave SAWTOOTH by charging/discharging the capacitor 42. In the switching control circuit of the present embodiment, the off period of the switching element 2 is adjusted by adjusting the fall period (the discharge period of the capacitor 42) of the triangular wave SAWTOOTH.

The off period adjusting circuit 7 generates the adjusting signal OFF_C by charging/discharging the capacitor 54. The discharge period of the capacitor 42 in the oscillator 19 is adjusted according to the potential of the adjusting signal OFF_C. To be specific, the capacitor 54 of the off period adjusting circuit 7 has a predetermined potential with the switching element 2 under PWM control in a steady state. When the drain current IDS is equal to or higher than the detection criterion in the blanking period Tblk, the P-type MOSFET 48 is turned on and the potential of the capacitor 54 decreases in a period during which the drain current IDS passes in the blanking period Tblk. The discharge period of the capacitor 42 in the oscillator 19 increases according to the reduced potential. When the output signal R_PULSE of the controller 18 is set at a high level, the N-type MOSFET 51 and the P-type MOSFET 49 are turned on, so that the capacitor 54 is charged and reaches the predetermined potential.

Figure 9:
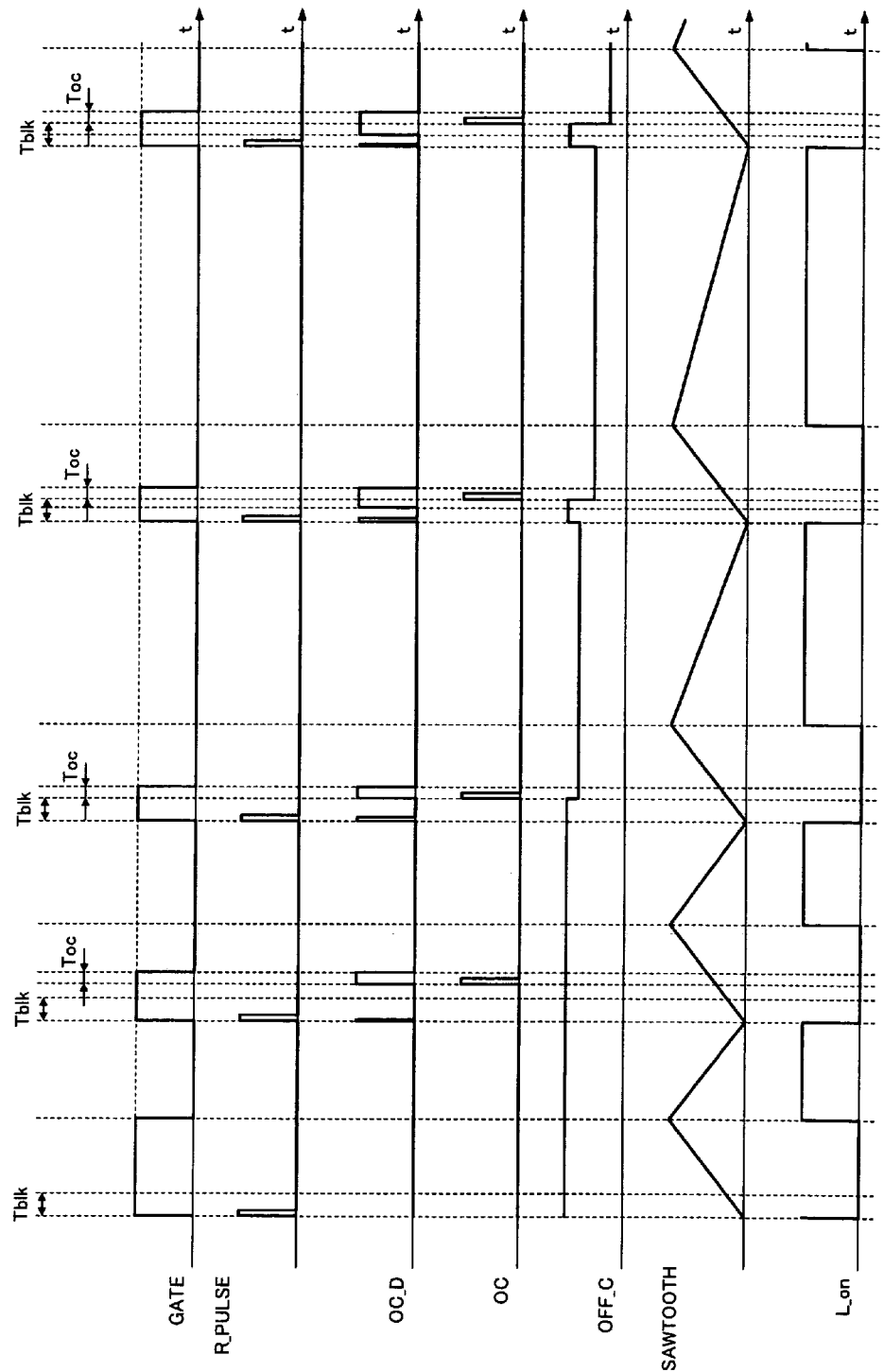
FIG. 9 is a diagram showing the operation waveforms of the switching control circuit according to the embodiment of the present invention.
Figure 10A:
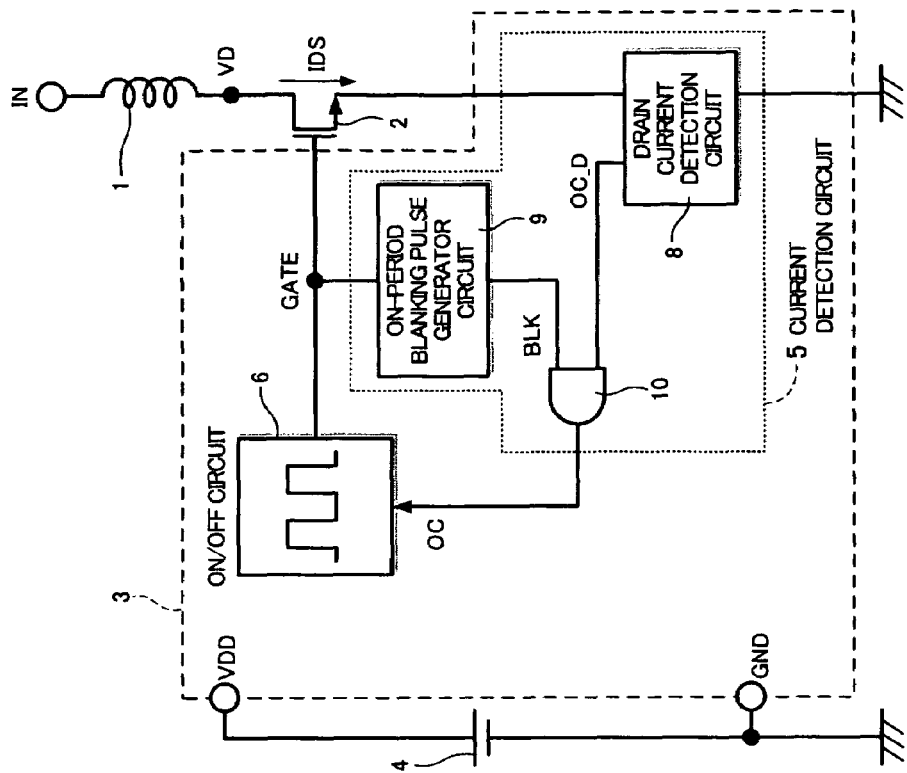
FIGS. 10A and 10B are block diagrams each schematically showing a conventional switching control circuit.
Figure 10B:
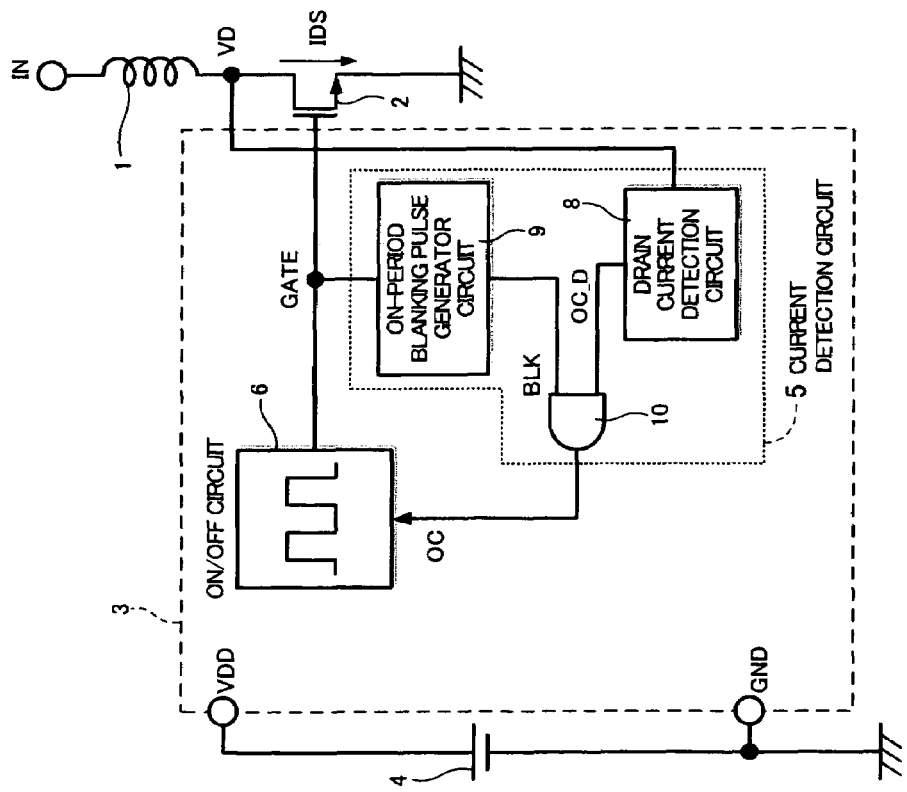
Figure 11C:
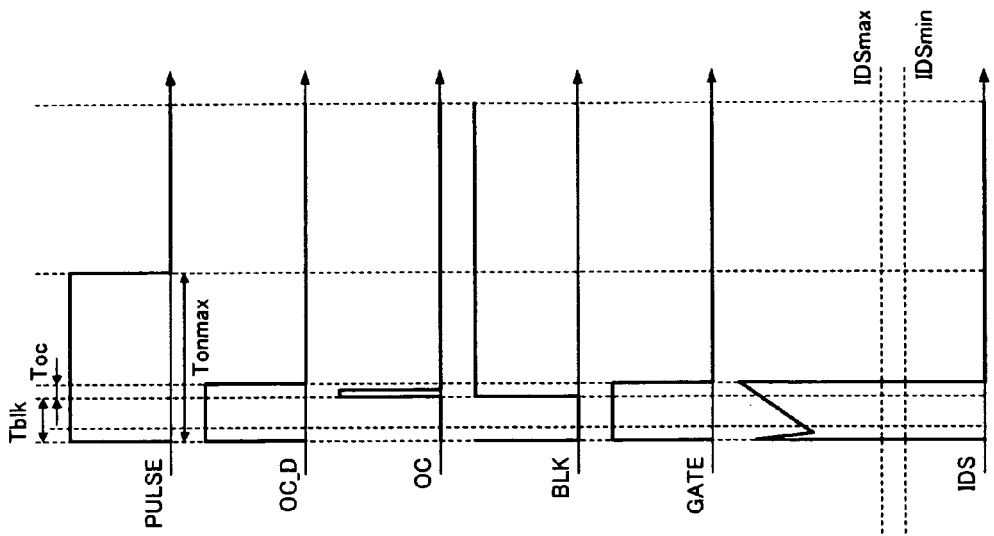
FIGS. 11A, 11B and 11C are diagrams each showing the operation waveforms of the conventional switching control circuit.
Figure 11B:
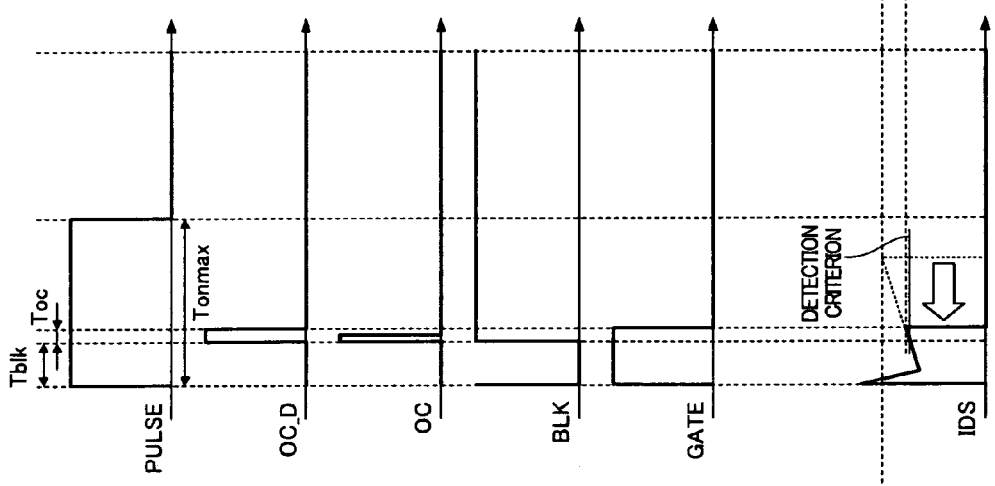
Figure 11A:
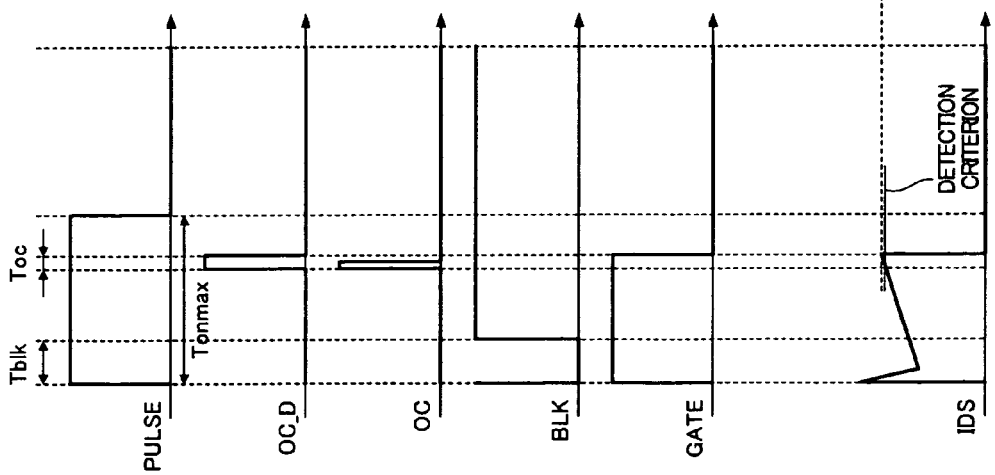
Figure 12:
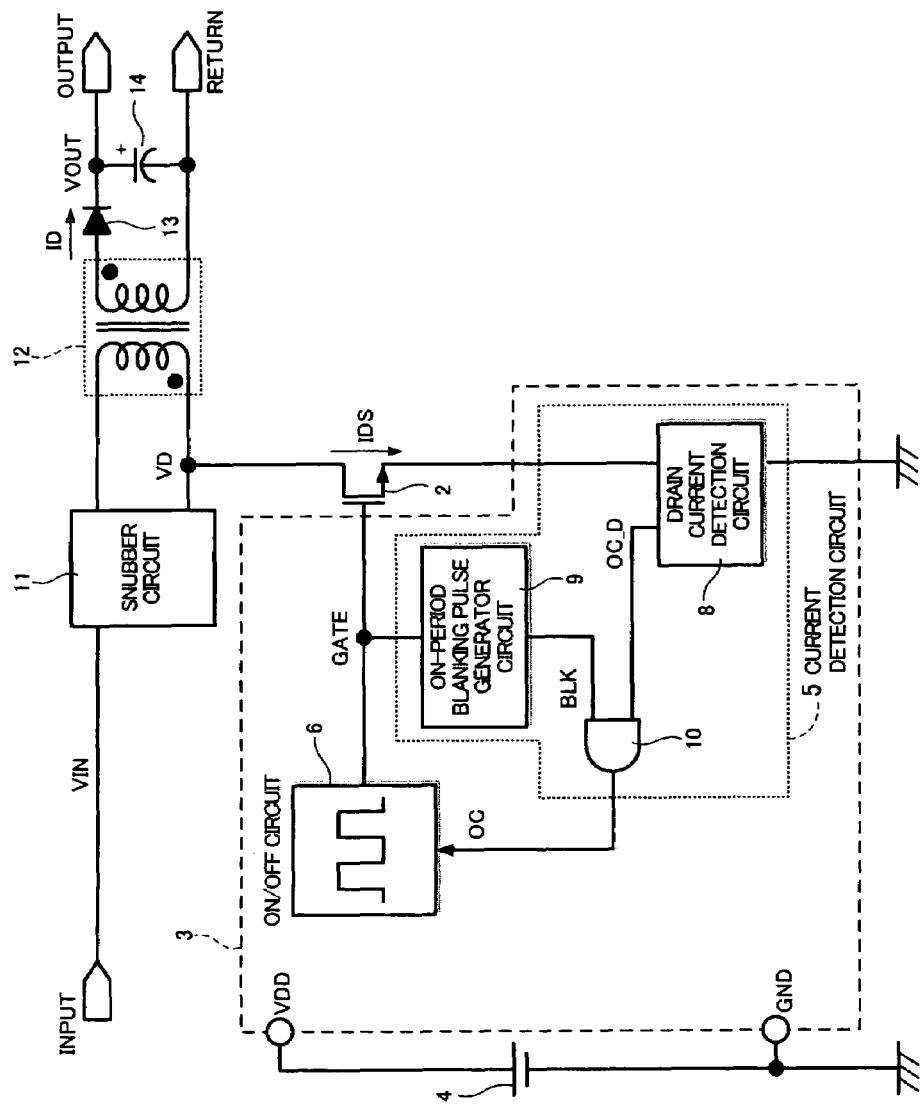
FIG. 12 is a block diagram schematically showing a switching power supply using the conventional switching control circuit.

The following will discuss operations when the switching control circuit configured thus is used for the switching power supply shown in FIG. 2. FIG. 9 shows the operation waveforms of the switching power supply when the terminal voltage VIN of the input terminal INPUT gradually increases.

As shown in FIG. 9, in the case of the switching element 2 under PWM control in a steady state, the triangular wave SAWTOOTH has a constant oscillation frequency and ordinary PWM control is performed. When the on period of the switching element 2 is equal to the minimum pulse period, the level of the adjusting signal OFF_C decreases in proportion to a length of the period during which the drain current IDS passes in the blanking period Tblk, and the fall period of the triangular wave SAWTOOTH increases. As a result, the off period of the switching element 2 linearly increases with a length of the period during which the drain current IDS passes in the blanking period Tblk.

As described above, the switching control circuit of the present invention can increase the off period of the switching element when the on period of the switching element is equal to the minimum pulse period. Thus the switching control circuit of the present invention is useful for general devices and equipment using switching control circuits, particularly for switching power supplies and LED drivers.

What is claimed is:

1. A switching control circuit, comprising:
   a switching element having a high potential terminal, a low potential terminal, and a control terminal, the high potential terminal being connected to an inductive load, the low potential terminal being connected to a circuit reference potential, the switching element being turned on/off in response to a switching control signal applied to the control terminal,
   an element current detection circuit for detecting element current passing through the switching element according to a detection criterion, thereby generating an element current detection signal for turning off the switching element,
   a blanking signal generator circuit for generating a blanking signal for making the element current detection signal ineffective for a fixed period after the switching element is switched from off state to on state,
   an off period adjusting circuit for generating, based on the element current detection signal and the blanking signal, an adjusting signal for adjusting an off period of the switching element according to an on period of the switching element, and
   an on/off circuit for generating, based on the element current detection signal, the blanking signal, and the adjusting signal, the switching control signal for controlling a periodic on/off operation of the switching element.

2. The switching control circuit according to claim 1, wherein the on/off circuit has a switch for switching the off period of the switching element to a predetermined off period, and the off period adjusting circuit controls the switch in response to the adjusting signal to switch the off period of the switching element to the predetermined off period when the element current detection circuit detects the element current for a predetermined period or longer in a fixed period during which the element current detection signal is made ineffective in response to the blanking signal.

3. The switching control circuit according to claim 1, wherein the off period adjusting circuit generates the adjusting signal for making the off period of the switching element proportionate to the period during which the element current detection circuit detects the element current in the fixed period during which the element current detection signal is made ineffective in response to the blanking signal.

* * * * *